United States Patent [19]

Waterman et al.

[11] Patent Number: 5,439,050
[45] Date of Patent: Aug. 8, 1995

[54] MULTI-POISED CONDENSING FURNACE

[75] Inventors: Timothy J. Waterman, Carmel; Larry D. Rieke, Zionsville; Delbert G. Keys, Greenwood, all of Ind.

[73] Assignee: Carrier Corporation, Syracuse, N.Y.

[21] Appl. No.: 89,697

[22] Filed: Jul. 9, 1993

[51] Int. Cl.⁶ .............................................. F28F 3/12
[52] U.S. Cl. ...................................... 165/170; 126/110 R
[58] Field of Search ............ 165/168, 170; 126/99 R, 126/110 R, 116 R, 119

[56] References Cited

U.S. PATENT DOCUMENTS

| | | | |
|---|---|---|---|
| 1,158,576 | 11/1915 | Sonneborn | 126/119 X |
| 4,066,121 | 1/1978 | Kleine et al. | 165/170 |
| 4,099,559 | 7/1978 | Butt | 165/170 |
| 4,160,440 | 7/1979 | Barnickle | 126/110 R |
| 4,515,145 | 5/1985 | Tallman et al. | 126/110 R X |
| 4,807,588 | 2/1989 | Bentley et al. | 126/110 R |
| 5,094,224 | 3/1992 | Diesch | 126/110 R X |
| 5,271,376 | 12/1993 | Lu et al. | 126/110 R |
| 5,345,924 | 9/1994 | Rieke et al. | 126/110 R |
| 5,346,001 | 9/1994 | Rieke et al. | 165/170 |

Primary Examiner—Martin P. Schwadron
Assistant Examiner—L. R. Leo

[57] ABSTRACT

A secondary condensing heat exchanger for use in a multi-poised furnace that includes multiple single pass heat transfer stages. Each stage includes a housing having an entrance at one end and a pair of outlets at the other end. The walls of the housing are arranged to conduct condensate formed in the housing through one or both outlets, depending on the orientation of the furnace. Lateral flow restrictors are mounted in the housing to direct flue gas products entering the housing back and forth across the housing.

26 Claims, 6 Drawing Sheets

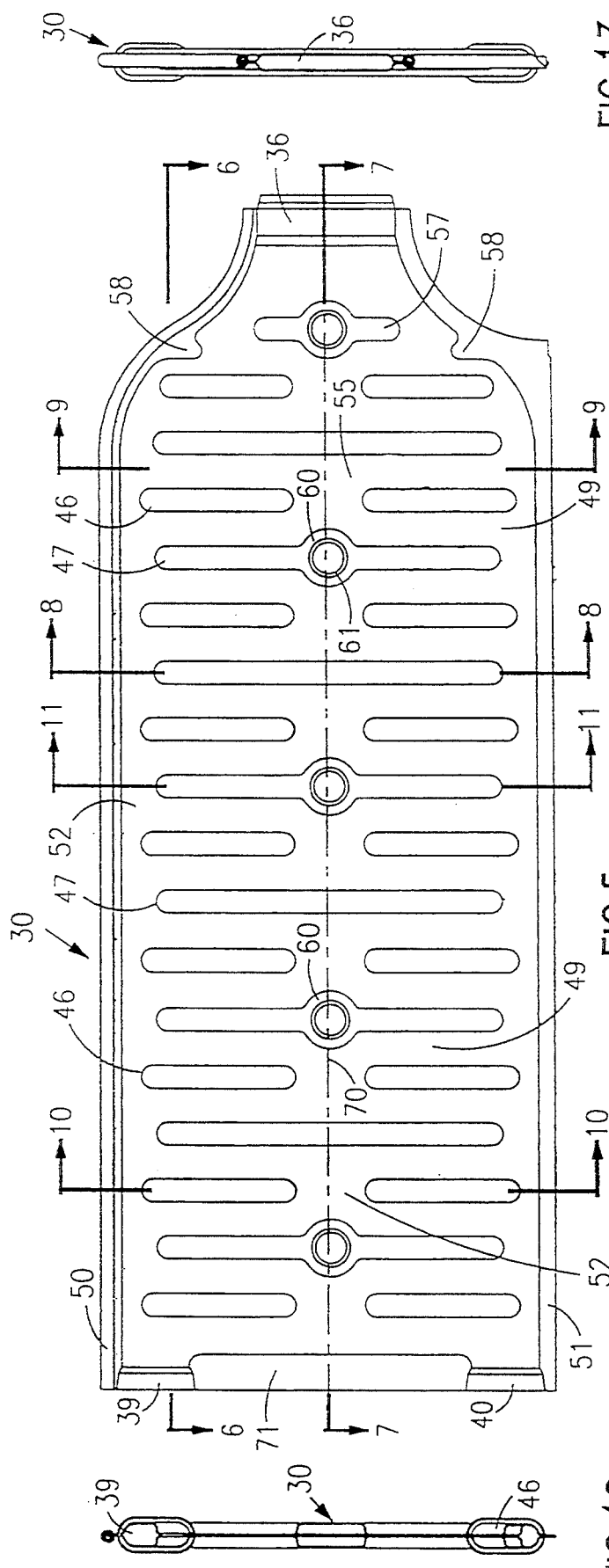
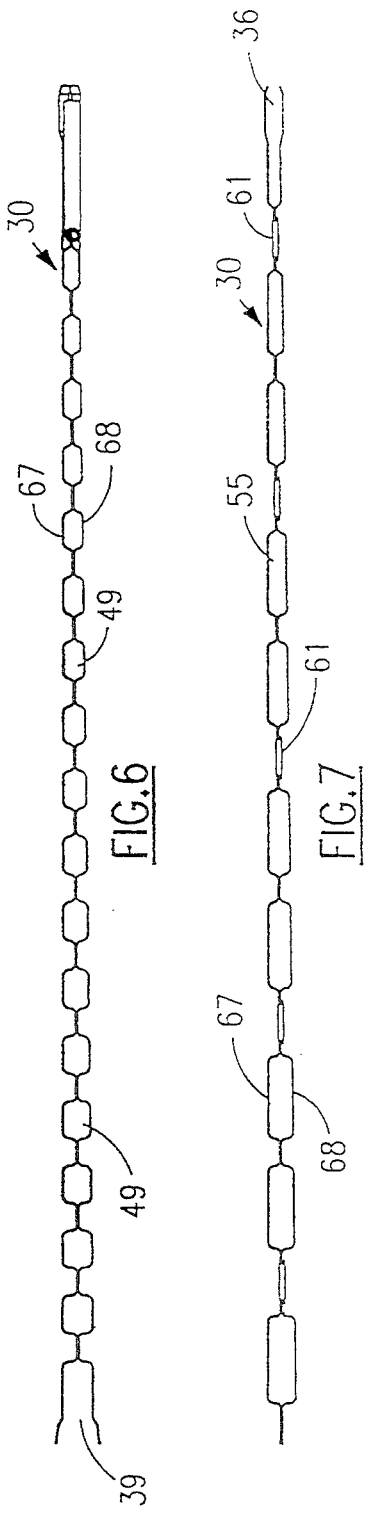

MULTI-POISED CONDENSING FURNACE

BACKGROUND OF THE INVENTION

This invention relates to a multi-poised condensing furnace and, in particular, to a secondary condensing heat exchanger for use in a multi-poised furnace.

The term multi-poised furnace, as herein used, refers to a furnace that can be orientated so that conditioned return air leaving the furnace may be discharged in either an upward or downward direction, as well as horizontally both to the left or to the right, without modifications to the furnace. Some furnaces are presently available that allow the unit to be installed in different positions, however, for the most part, these units require extensive modifications to achieve the desired result.

High efficiency furnaces extract most of the available energy from the flue gases and as a result any moisture found in the flue gas products will be reduced to condensate while the gases are in the heat exchanger of the furnace. Typically, the multi-poise furnace is equipped with a primary heat exchanger which partially receives high temperature flue gases from a burner and transfers a high percentage of the available energy to the return air. The partially cooled gases are then passed to a secondary condensing heat exchanger designed to further extract energy from the gases to a level wherein condensate is formed. If the condensate is permitted to collect in the secondary heat exchanger, the exchanger surface can corrode rapidly leading to an early failure of the unit. By the same token, if condensate is permitted to build up in the exchanger the efficiency, and thus the performance of the furnace, will be adversely effected.

SUMMARY OF THE INVENTION

It is therefore an object of the present invention to improve multi-poised condensing furnaces.

A further object of the present invention is to improve the performance of a multi-poised condensing furnace.

A still further object of the present invention is to improve the condensate handling capability of a multi-poised condensing furnace.

Another object of the present invention is to provide an improved secondary condensing heat exchanger for use in a multi-poised furnace.

Yet another object of the present invention is to provide a secondary condensing heat exchanger for use in a multi-poised furnace that will provide highly efficient performance, regardless of the furnace's orientation.

Still another object of the present invention is to improve the heat transfer characteristics of a secondary condensing heat exchanger.

It is yet another object of the present invention to provide a high performance condensing heat exchanger that can be fabricated rapidly and economically.

These and other objects of the present invention are attained by a multi-stage condensing heat exchanger suitable for use in a multi-poised condensing furnace for transferring energy from flue gas products into a return air flow passing along the heat transfer surfaces of the stage. Each stage includes an elongated housing having top and bottom walls, opposed side walls and end walls. The wall of the housing converges from one end wall toward the opposite end wall so that condensate forming in the housing is conducted through the outlet. In a further embodiment of the invention, a series of spaced-apart, laterally-disposed flow restrictors are mounted inside the housing which directs the flue gas flow along an extended flow path to increase the amount of heat transferred between the flue gas and return air passing over the housing. Each stage of the heat exchanger is stamped from a single sheet of metal thereby reducing the manufacturing cost of the stages.

BRIEF DESCRIPTION OF THE DRAWINGS

For a better understanding of these and other objects of the present invention, reference will be made to the following detailed description of the invention which is to be read in association with the attached drawings whereby:

FIG. 5 is a further enlarged side elevation showing one of the single pass stages utilized in the present heat exchanger;

FIG. 6 is a sectional view taken along lines 6—6 in FIG. 5;

FIG. 7 is a sectional view taken along lines 7—7 in FIG. 5;

FIG. 12 is a right end view of the heat exchanger stage shown in FIG. 5; and

FIG. 13 is a left end view of the heat exchanger stage shown in FIG. 5.

DESCRIPTION OF THE INVENTION

Figure 1:
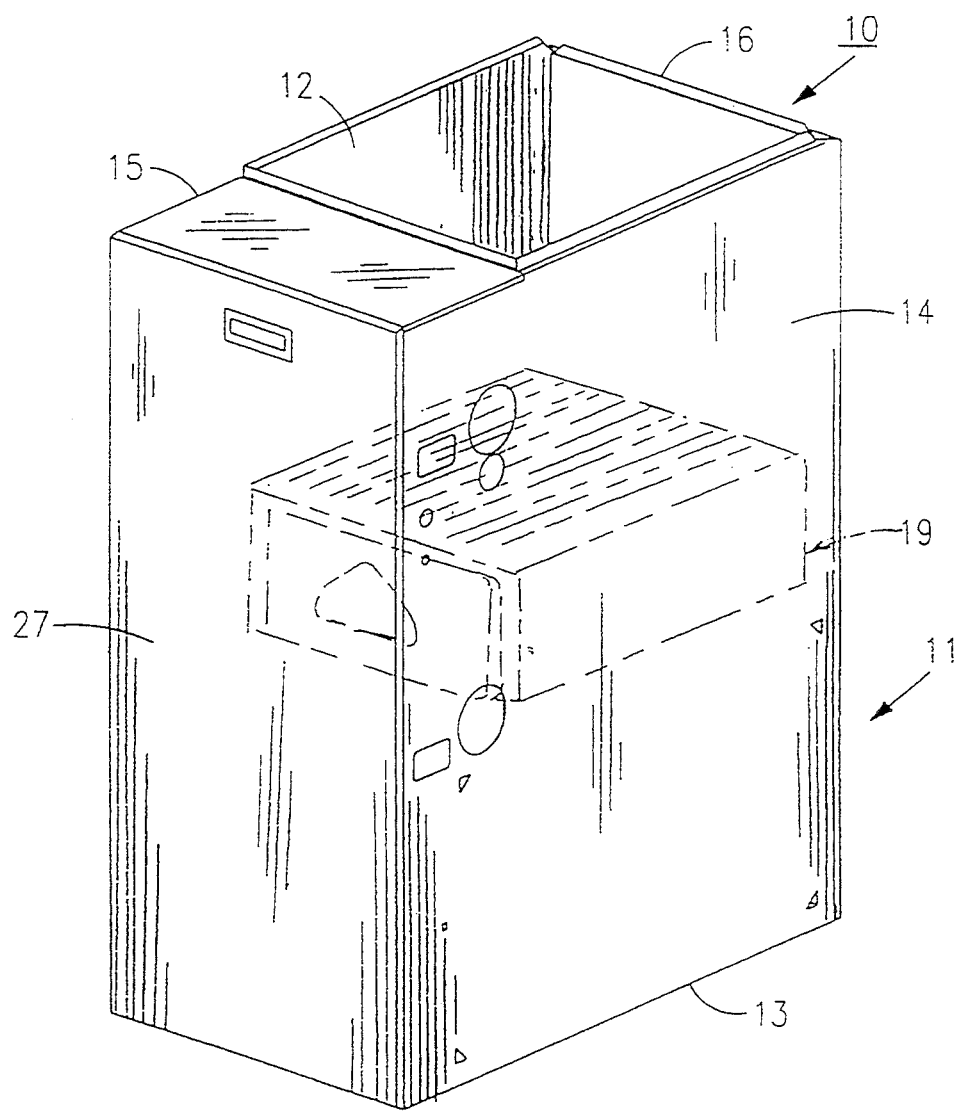
FIG. 1 is a perspective view showing a multipoised furnace containing a secondary condensing heat exchanger embodying the teachings of the present invention.

Referring initially to FIGS. 1–4, there is illustrated a multi-poised furnace, generally referenced 10, that is housed within a compact rectangular enclosure 11. The furnace is shown in FIG. 1 in an upflow orientation wherein return air from a comfort zone is brought into the furnace through an opening in the bottom section of the furnace and passed upward through a vertically-disposed return air duct before being discharged through an opening in the top of the furnace. The furnace is enclosed by a bottom panel 13, two side panels 14 and 15, a back panel 16 and a removable front panel 27. Although not shown, the furnace can be configured so the return air entrance may be selectively located in the bottom panel, either of the side panels or the back panel.

Figure 2:
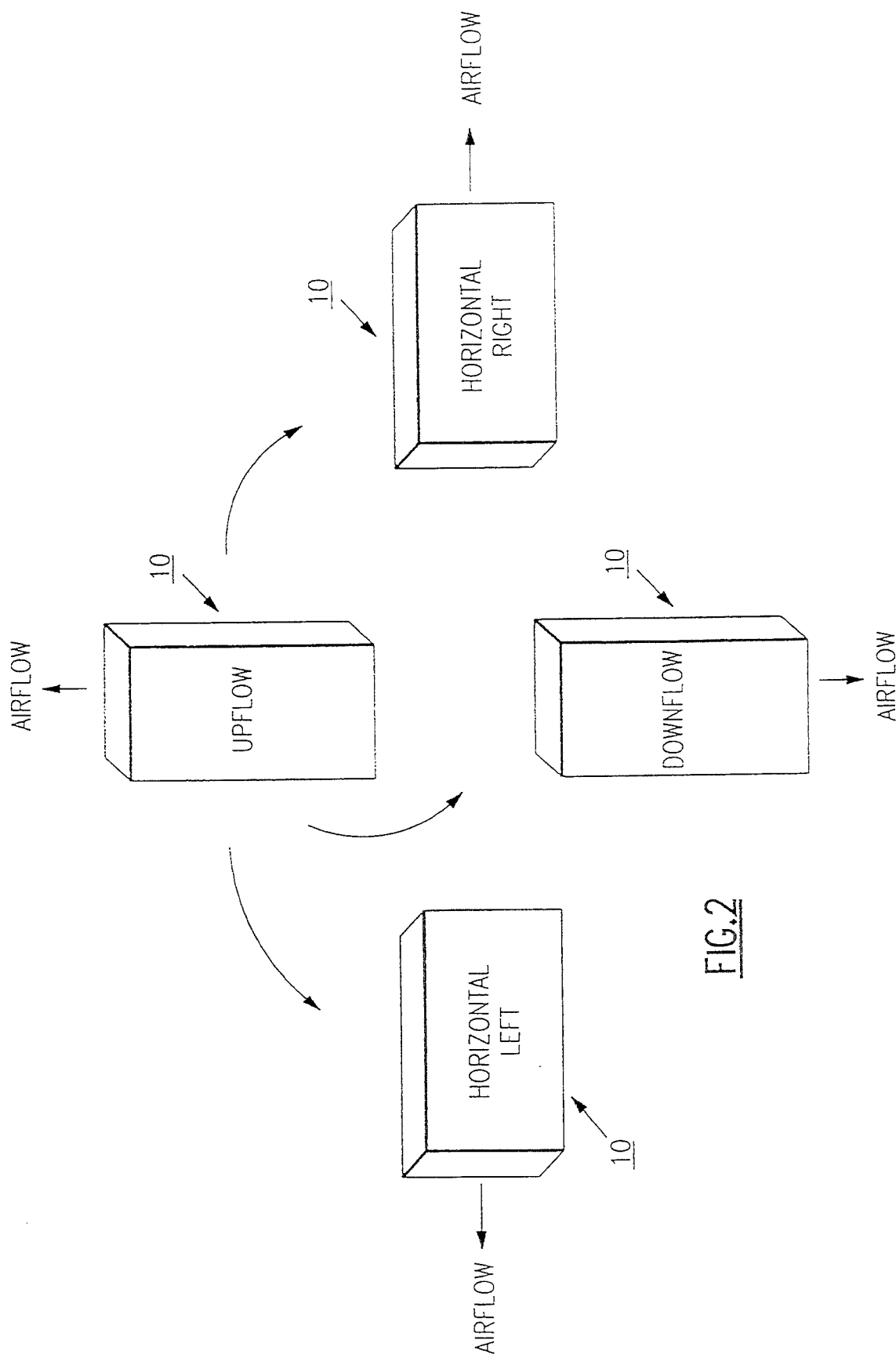
FIG. 2 is a diagrammatic view showing the present furnace in different orientations.
Figure 3:
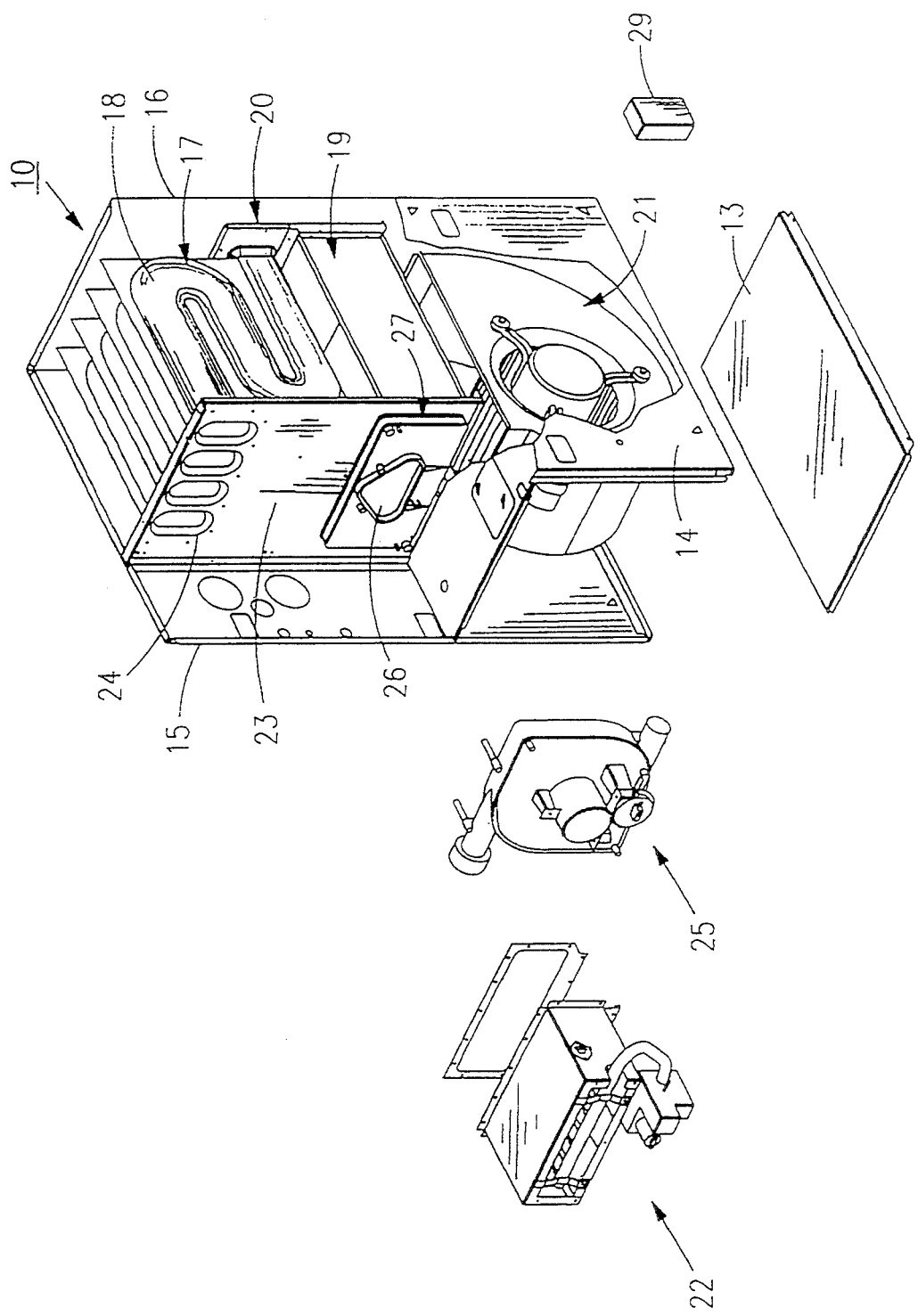
FIG. 3 is an exploded view in perspective showing major components of the present furnace.

It should be noted that relative terms such as top and bottom, as used in the present disclosure, will refer to the location of various components or regions of the furnace when the furnace is standing in an upflow orientation as illustrated in FIGS. 1 and 3. However, the furnace is designed so that it can be mounted in various orientations as illustrated in FIG. 2. These orientations include the noted upflow orientation and a downflow orientation wherein the entire furnace is inverted. In addition, the furnace may be placed on its side to provide a horizontal discharge to either the right or to the left. As should be evident, the secondary condensing heat exchanger must be able to operate efficiently in any of the noted orientations. Among other things, the secondary heat exchanger must be able to extract a maximum amount of energy from the flue gas products while at the same time effectively removing condensate from the exchanger region, regardless of the furnace orientation.

The major components of the furnace are shown in FIG. 3. These include, in addition to the secondary heat exchanger 19, a primary heat exchanger that is mounted in the return air duct immediately above the secondary unit. The outlet side of the primary unit is operatively connected in fluid flow communication to the inlet of the secondary unit by a flue gas manifold 20. A return air fan 21 is mounted in the bottom section of the furnace and is arranged to force incoming return air through the return air duct sequentially over the heat transfer surfaces of the secondary heat exchanger unit and the primary heat exchanger.

A burner assembly 22 is affixed to interior vertical support panel 23 in front of the entry ports 24 to each of the primary heat exchanger stages 18. The burner assembly contains a separate burner for each primary stage and is adapted to inject high temperature flue gas products directly into an adjacent stage.

An inducer 25 is also affixed to the vertical panel 23 and is connected, in assembly, to the exit port 26 of collector box 27 located at the exit of the secondary heat exchanger. The inducer functions to draw the flue gas products through the two heat exchangers and discharge spent products into a venting system. The inducer can be selectively arranged to vent to either side of the furnace, depending upon the furnace's orientation. As will be explained in greater detail below, the secondary heat exchanger is designed to conduct any condensate developed therein into the collector box 27. A condensate trap 29 is also provided that can be mounted on either side panel of the furnace which is connected by suitable lines to the exterior mounted collector box for disposal.

Figure 4:
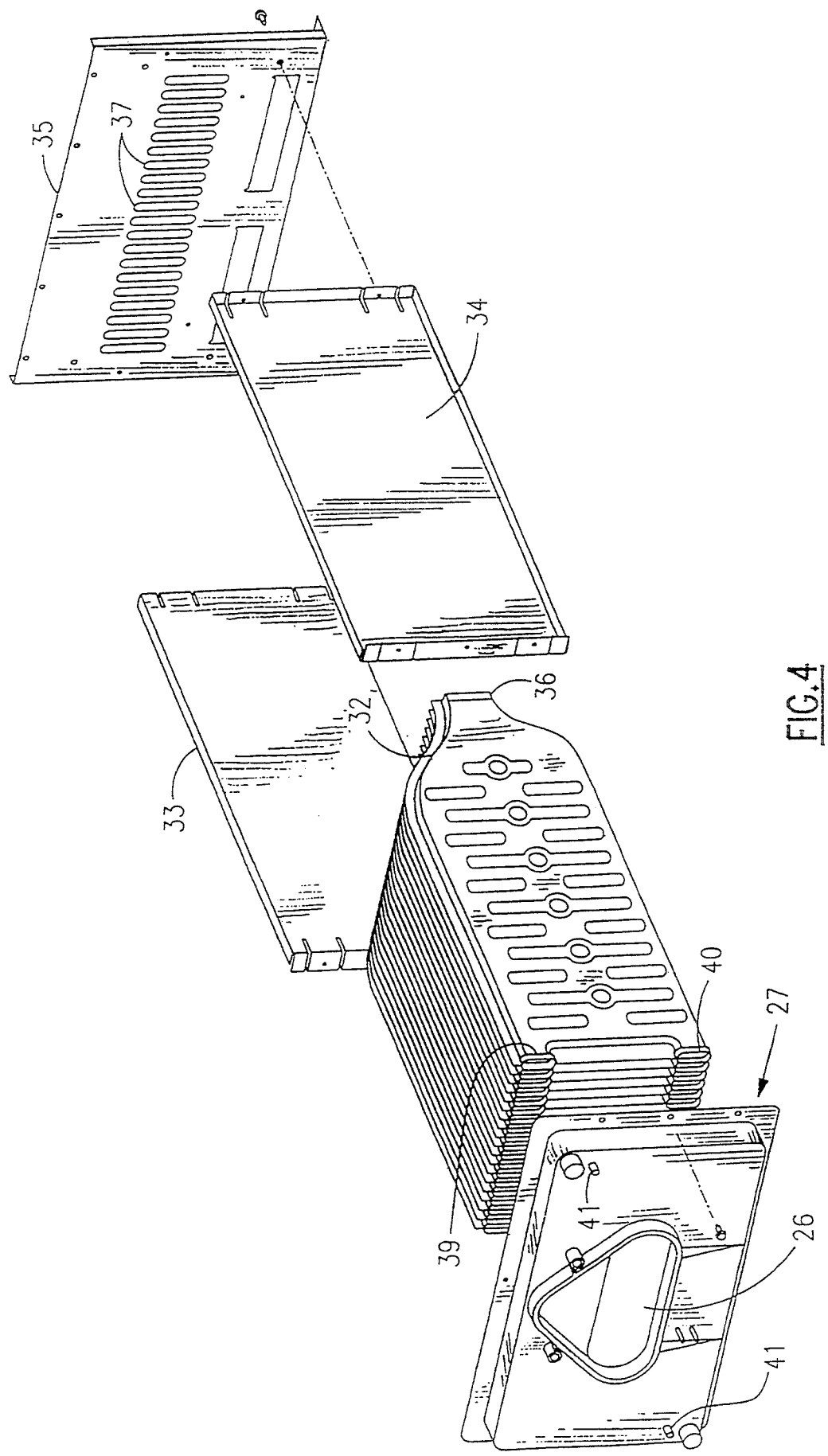
FIG. 4 is an enlarged, exploded view of the secondary condensing heat exchanger embodying the teachings of the present invention.
Figure 11:
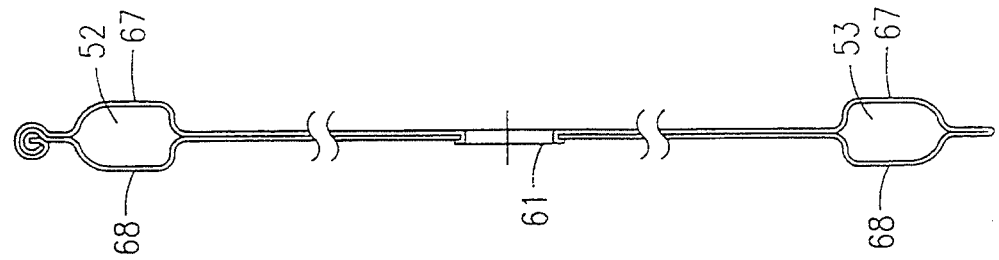
FIG. 11 is a sectional view taken along lines 11—11 in FIG. 5.
Figure 10:
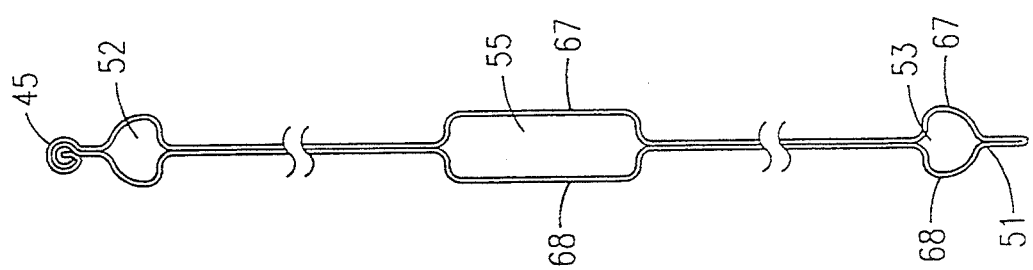
FIG. 10 is a sectional view taken along lines 10—10 in FIG. 5.
Figure 9:
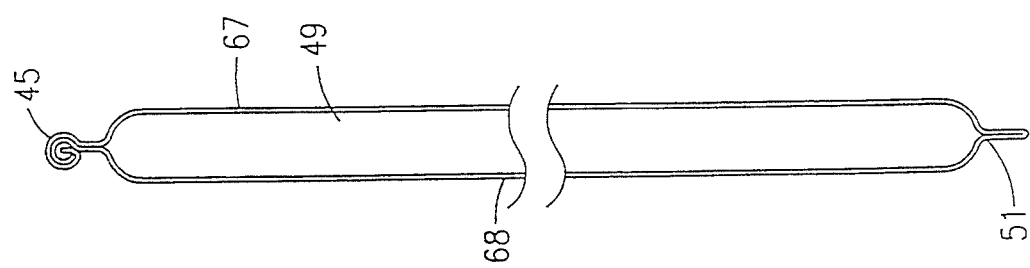
FIG. 9 is a sectional view taken along lines 9—9 in FIG. 5.
Figure 8:
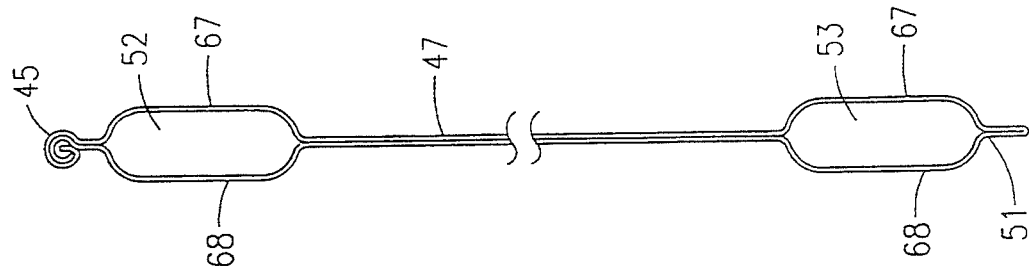
FIG. 8 is a sectional view taken along lines 8—8 in FIG. 5.

FIG. 4 is an exploded view showing the construction of the secondary condensing heat exchanger 17. The unit includes a series of parallely-aligned, individual heat exchanger stages 30—30, which as noted above, are vertically-disposed within the return air duct 31 (FIG. 1) of the furnace. The stages are separated by fin plates 32—32 which help to distribute the return air flow and enhance the heat transfer characteristics. The unit further includes a pair of opposed side walls 33 and 34 that are mounted between a back wall 35 and heretofore mentioned collector box 27. The back panel 35 forms the front face of the flue gas manifold 20 which conducts flue gas products from the primary heat exchanger into the secondary condensing heat exchanger. Each secondary heat exchanger stage 30 contains an inlet 36 centrally mounted in the back wall of the stage along axial center line 70. The inlet is received in one of a series of slotted holes 37—37 formed in the back panel 35. As will be explained in greater detail below, each stage 30 includes an upper outlet 39 and a lower outlet 40 formed in end wall 71 which, in assembly, empties flue gas products into the collector box 27. The collector box has a pair of condensate ports 41—41 which are diagonally situated at opposite corners of the box. A selected one of the ports, depending on furnace orientation, is connected to the heretofore mentioned condensate trap 29 (FIG. 3) by a suitable line whereby condensate collected in the box will be conducted by gravity to the trap. The other unused condensate port is plugged in final assembly.

Turning now to FIGS. 5–13, there is illustrated in greater detail the construction of the individual single pass condensing heat exchanger stages. Each stage includes a housing 30, the contours of which are stamped in two complementary half- sections into a single sheet of metal. The half- sections are turned into face-to-face contact about an axially-disposed bendline extending along the bottom wall 51 of the housing. The contacting peripheral edges of the two sheet metal half-sections are rolled together to form a joint 45 which is then closed by crimping to provide a tight, leakproof closure along the contact edges.

Each half-section contains a series of laterally-extended, flat-faced beads 46 and 47 that close against each other, as shown in FIGS. 6 and 12, to establish flow restrictors within the housing. The flow restrictors establish a series of parallel, laterally-disposed flow passages 49 that extend across the housing between the top wall 50 and the bottom wall 51 thereof. An uninterrupted flow channel 52 extends axially along the top wall of the housing while a similar flow channel 53 extends axially along the bottom wall of the housing. Flow restrictors 46, which represent every other resistor in the series, are further provided with central openings 55 for placing the adjacent flow passages in fluid flow communication.

A flow distributor bead 57 is also placed in the entrance region to the housing immediately behind the housing inlet. The distributor bead cooperates with wall distributors 58—58 to split the incoming flue gas flow and distributes it uniformly into the downstream flow passages and channels. The flow distributor 57 and selected flow restrictors 47 are provided with expanded mid-sections 60. A rivet 61, or any other suitable fastening member, is passed through the expanded mid-section regions and crimped into locking contact against the outer surfaces of the two half-sections to further secure the half-sections in face-to-face contact.

The outer walls of the passages and channels coact to describe the opposed side walls 67 and 68 of the housing. As best illustrated in FIGS. 6 and 7, the side walls diverge from the entrance of the housing toward the twin exits thereof. As a result, the cross-sectional area of the flow passages and channels increase or expand in the direction of flue gas flow from the entrance region toward the exit region. By the same token, the top and bottom walls of the housing diverge slightly in the same direction. As a result of this construction, condensate formed in the secondary heat exchanger is conducted by gravity out of one or both of the two exits, depending on the furnace orientation into the collector box.

Due to the secondary heat exchanger multiple flow passage design, the entering flue gas products are exposed to an increased heat transfer surface when compared to most single pass exchangers. As noted, the flow passages are smaller at the entrance region to the housing than at the exit region thus providing for an increase in the velocity of the entering flue gas increasing the stored or sensible energy in the flow. As the flow moves back and forth across the housing, the gases expand reducing the flow velocity while at the same time exposing the gases to the expanded heat transfer surfaces. This, in turn, increases the amount of energy that is transferred to the return air passing between the stages.

While this invention has been explained with reference to the structure disclosed herein, it is not confined to the details set forth and this invention is intended to cover any modifications and changes as may come within the scope of the following claims:

What is claimed is

1. A condensing heat exchanger stage suitable for use in a multi-poise condensing furnace that includes
a heat exchanger housing that is elongated along a central axis,
said housing including top and bottom walls, a pair of opposed side walls and a pair of opposed end walls,
an inlet means situated in one end wall and an outlet means situated in the other end wall whereby hot flue gases entering the housing through the inlet means are conducted through the housing and discharged through said outlet means,
a series of spaced-apart flow restrictors laterally-disposed inside said housing between the top and bottom walls to establish laterally-disposed flow passages between said restrictors,
axially-disposed flow channels located between the ends of the restrictors and the top and bottom walls for interconnecting the laterally-disposed flow passages, and
said top and bottom walls and said side walls of the housing diverging from said one end wall toward said other end wall whereby condensate formed in the housing flows from the inlet means toward the outlet means, regardless of the housing's orientation about its central axis.

2. The heat exchanger stage of claim 1 wherein said outlet means includes a first outlet adjacent to the top wall and a second outlet adjacent to the bottom wall of the housing.

3. The heat exchanger stage of claim 1 wherein a number of flow restrictors have axially-disposed openings formed therein about the central axis of the housing whereby adjacent, laterally-disposed flow passages communicate through said openings.

4. The heat exchanger stage of claim 3 wherein said openings are provided in every second flow restrictor in said series.

5. The heat exchanger stage of claim 1 wherein the stage is stamped in two half-sections from a single sheet of metal and the sections are turned about a bendline extending axially along the bottom wall of the housing into face-to-face relationship.

6. The heat exchanger stage of claim 5 that further includes seam means located along the contacting peripheral edges of said half-sections for joining the two sections in face-to-face contact.

7. The heat exchanger stage of claim 6 that further includes fastening means centrally located in a number of said restrictors for further joining the two sections in face-to-face contact.

8. The heat exchanger stage of claim 7 wherein said restrictors are formed by indentations that are stamped in the opposing side walls of the half-sections and which close in face-to-face relationship one against the other.

9. The heat exchanger stage of claim 1 wherein the inlet means is centered in said one end wall upon the axis of the housing and further including distributor means immediately downstream from said inlet means for splitting the incoming flow into at least two separate flow streams.

10. The heat exchanger stage of claim 1 wherein the cross-sectional areas of the flow passages and the channels increase from the inlet toward the outlet of the housing whereby the flow velocity of the flue gases is reduced as they move through the housing.

11. A condensing heat exchanger for use in a multi-poised furnace that includes
a return air duct through which return air is passed,
a series of parallel condensing heat exchanger stages mounted in spaced-apart relationship within said duct whereby return air passes between the stages,
each stage including an enclosed housing that is elongated along a central axis and having a flue gas inlet means at one end and an outlet means at the other end,
flow restrictors mounted in the housing for directing the incoming flow of flue gas into multiple, laterally-disposed flow paths, and
said housing having walls that diverge from the inlet means toward the outlet means for conducting condensate formed in the housing through said outlet means.

12. The heat exchanger of claim 11 further including a common manifold means connected to the inlet means of each stage for introducing flue gas products into each stage.

13. The heat exchanger of claim 12 wherein the housing inlet is centered upon said central axis.

14. The heat exchanger of claim 11 wherein the housing of each stage includes a top wall and a bottom wall and further includes a first outlet adjacent to the top wall and a second outlet adjacent to the bottom wall of the housing.

15. The heat exchanger of claim 14 that includes axially-disposed flow channels adjacent the top and bottom walls which interconnect the laterally-disposed flow channels.

16. The heat exchanger of claim 15 wherein a number of said flow restrictors further include axially-disposed openings formed therein along the central axis of said housing through which adjacent, laterally-disposed flow passages communicate.

17. The heat exchanger of claim 15 wherein the cross-sectional areas of the passages and channels increase from the inlet means toward the outlet means.

18. The heat exchanger of claim 11 wherein the housing is stamped in two half-sections from a single sheet of metal and the half-sections are turned into face-to-face contact along a bendline axially-disposed along the bottom wall of the housing.

19. The heat exchanger of claim 18 that further includes seam means along the contacting peripheral edges of the two half-sections.

20. The heat exchanger of claim 19 that further includes fastening means for securing together contacting regions of the half-sections.

21. A condensing heat exchanger stage suitable for use in a multi-poise condensing furnace that includes
a heat exchanger housing that is elongated along a central axis,
said housing including top and bottom walls, a pair of opposed side walls and a pair of opposed end walls,
an inlet means situated in one end wall and an outlet means situated in the other end wall whereby hot flue gases entering the housing through the inlet means are conducted through the housing and discharged through said outlet means, and said top and bottom walls and said side walls of the housing diverging from said one end wall toward said other end wall whereby condensate formed in the housing flows from the inlet means toward the outlet means, regardless of the housing's orientation about its central axis.

22. The heat exchanger stage of claim 21 wherein said outlet means includes a first outlet adjacent to the top wall and a second outlet adjacent to the bottom wall of the housing.

23. The heat exchanger stage of claim 21 wherein the stage is stamped in two half-sections from a single sheet of metal and the sections are turned about a bendline extending axially along the bottom wall of the housing into face-to-face relationship.

24. The heat exchanger stage of claim 23 that further includes seam means located along the contacting peripheral edges of said half-sections for joining the two sections in face-to-face contact.

25. The heat exchanger stage of claim 21 wherein the inlet means is centered in said one end wall upon the axis of the housing and further including distributor means immediately downstream from said inlet means for splitting the incoming flow into at least two separate flow streams.

26. The heat exchanger stage of claim 21 wherein the cross-sectional areas of the housing increase from the inlet toward the outlet of said housing whereby the flow velocity of the flue gases is reduced as they move through the housing.

* * * * *